(12) United States Patent
Cheng et al.

(10) Patent No.: US 12,711,746 B2
(45) Date of Patent: Aug. 18, 2026

(54) GUIDED POST-DEPLOYMENT TRAINING OF CUSTOMIZED RECOGNITION MODELS

(71) Applicant: Wyze Labs, Inc., Kirkland, WA (US)

(72) Inventors: Zhongwei Cheng, Bothell, WA (US); Vijaya Naga Jyoth Sumanth Chennupati, Bothwell, WA (US); Lin Chen, Seattle, WA (US); Tianqiang Liu, Kirkland, WA (US)

(73) Assignee: Wyze Labs, Inc., Kirkland, WA (US)

( * ) Notice: Subject to any disclaimer, the term of this patent is extended or adjusted under 35 U.S.C. 154(b) by 232 days.

(21) Appl. No.: 18/558,922

(22) PCT Filed: May 3, 2022

(86) PCT No.: PCT/US2022/027522

§ 371 (c)(1),
(2) Date: Nov. 3, 2023

(87) PCT Pub. No.: WO2022/235707

PCT Pub. Date: Nov. 10, 2022

(65) Prior Publication Data

US 2024/0233342 A1 Jul. 11, 2024

Related U.S. Application Data

(60) Provisional application No. 63/183,473, filed on May 3, 2021.

(51) Int. Cl.

*G06V 10/774* (2022.01)
*G06V 10/764* (2022.01)
*G06V 20/52* (2022.01)

(52) U.S. Cl.

CPC .......... *G06V 10/774* (2022.01); *G06V 10/764* (2022.01); *G06V 20/52* (2022.01)

(58) Field of Classification Search

CPC .... G06V 10/774; G06V 10/764; G06V 20/52; G06V 10/7788; G06V 10/7753;

(Continued)

(56) References Cited

U.S. PATENT DOCUMENTS 8,797,405 B2 * 8/2014 Cobb .................... G06V 20/52
348/161
10,387,794 B2 * 8/2019 Okanohara ........... G06N 20/00

(Continued)

OTHER PUBLICATIONS

U.S. International Search Authority, International Search Report and Written Opinion mailed Sep. 2, 2022 for PCT/US22/27522 filed May 3, 2022, Applicant: Wyze Labs, Inc., 9 pages.

(Continued)

*Primary Examiner* — Michael S Osinski

(74) *Attorney, Agent, or Firm* — Ashurst Perkins Coie US LLP; Nicole Dunham; Andrew T. Pettit

(57) ABSTRACT

Introduced here is a training system that allows users to define what they would like their surveillance systems to detect, recognize, or otherwise identify. For simplicity, the use case provided by a given user for teaching purposes may be referred to as a "skill." A surveillance system can learn each of the skills provided by its respective user from a limited number of examples. For example, the given user may only provide several examples—or even a single example—in contrast to conventional learning approaches.

20 Claims, 10 Drawing Sheets

(58) Field of Classification Search
CPC .... G06V 10/82; G06V 20/44; G06F 18/2433; G06F 2218/10; G06F 2218/12; G10L 25/51; G06N 3/09; G06N 3/096; G06N 3/0985; G06N 3/045
See application file for complete search history.

(56) References Cited

U.S. PATENT DOCUMENTS

| | | | | |
|---|---|---|---|---|
| 11,205,098 | B1 * | 12/2021 | Wu | G06N 3/04 |
| 11,256,926 | B2 * | 2/2022 | Nicholson | G08G 1/0116 |
| 11,675,879 | B2 * | 6/2023 | Kerwin | G06F 18/214 382/103 |
| 11,797,824 | B2 * | 10/2023 | Perez Rua | G06N 3/09 |
| 11,900,706 | B1 * | 2/2024 | Qian | G06V 10/776 |
| 2010/0177956 | A1 * | 7/2010 | Cooper | G06V 20/70 382/159 |
| 2011/0050897 | A1 * | 3/2011 | Cobb | G06V 10/94 348/E7.054 |
| 2016/0217387 | A1 * | 7/2016 | Okanohara | G06N 20/00 |
| 2017/0220903 | A1 * | 8/2017 | Hertzmann | G06F 18/41 |
| 2018/0091832 | A1 * | 3/2018 | Zeiler | H04N 21/8133 |
| 2018/0189615 | A1 * | 7/2018 | Kang | G06V 10/82 |
| 2018/0300865 | A1 * | 10/2018 | Weiss | G05B 19/41875 |
| 2018/0330238 | A1 | 11/2018 | Luciw et al. | |
| 2019/0156106 | A1 * | 5/2019 | Schroff | G06V 40/161 |
| 2019/0325276 | A1 | 10/2019 | Fu et al. | |
| 2019/0325346 | A1 | 10/2019 | Okanohara et al. | |
| 2019/0354744 | A1 * | 11/2019 | Chaloux | G06F 40/58 |
| 2020/0013265 | A1 * | 1/2020 | Moloney | G06N 3/08 |
| 2020/0064456 | A1 | 2/2020 | Xu et al. | |
| 2020/0184227 | A1 * | 6/2020 | Felhi | G06V 40/50 |
| 2020/0401853 | A1 * | 12/2020 | Xiong | G06T 7/70 |
| 2020/0410287 | A1 * | 12/2020 | Chu | G06F 18/24 |
| 2021/0106274 | A1 * | 4/2021 | Elmaghraby | G06T 7/0016 |
| 2021/0125026 | A1 * | 4/2021 | Perez Rua | G06N 3/04 |
| 2021/0364447 | A1 * | 11/2021 | Naruse | G06T 7/001 |
| 2023/0007167 | A1 * | 1/2023 | Usami | H04N 23/61 |
| 2024/0080546 | A1 * | 3/2024 | Yamada | G06V 10/774 |

OTHER PUBLICATIONS

Zeng, Yuan et al.: "Few-Shot Scale-Insensitive Object Detection for Edge Computing Platform" IEEE Transactions on Sustainable Computing, vol. 7, No. 4, Oct.-Dec. 2022; pp. 726-735.

* cited by examiner

GUIDED POST-DEPLOYMENT TRAINING OF CUSTOMIZED RECOGNITION MODELS

CROSS-REFERENCE TO RELATED APPLICATIONS

This application claims priority to U.S. Provisional Application No. 63/183,473, titled "Guided Post-Deployment Training of Customized Event, Object, and Sound Recognition Models" and filed on May 3, 2021, which is incorporated herein by reference in its entirety.

TECHNICAL FIELD

Various embodiments concern surveillance systems and associated techniques for learning customized software-implemented models by those surveillance systems.

BACKGROUND

The term "surveillance" refers to the monitoring of behavior, activities, and other changing information for the purpose protecting people or items in a given environment. Generally, surveillance requires that the given environment be monitored using electronic devices such as digital cameras, lights, locks, motion detectors, and the like. Collectively, these electronic devices may be referred to as the "edge devices" of a "surveillance system" or "security system."

One concept that is becoming more commonplace in surveillance systems is edge intelligence. Edge intelligence refers to the ability of the edge devices included in a surveillance system to process information and make decisions prior to transmission of that information elsewhere. As an example, a digital camera (or simply "camera") may be responsible for discovering the objects that are included in digital images (or simply "images") before those images are transmitted to a destination. The destination could be a computer server system that is responsible for further analyzing the images. Edge intelligence is commonly viewed as an alternative to cloud intelligence, where the computer server system processes the information generated by the edge devices included in the surveillance system.

Performing tasks locally—namely, on the edge devices themselves—has become increasingly popular as the information generated by the edge devices continues to increase in scale. Assume, for example, that a surveillance system that is designed to monitor a home environment includes several cameras. Each of these cameras may be able to generate high-resolution images that are to be examined for surveillance purposes. In order to examine these images, each camera may apply software-implemented models (or simply "models") to its respective images in order to detect objects of interest. Generally, each model is designed and then trained to detect a different object.

Users commonly want to tailor their surveillance systems to detect certain objects. For example, a given user may wish to teach her surveillance system how to recognize herself, her child, or her pet. In order to accomplish this, a new model needs to be designed and then trained to detect a new "class" or "category" of object. Implementing these models is not trivial, however. This is especially true for sophisticated surveillance systems with large numbers of edge devices with varied capabilities.

Figure 1:
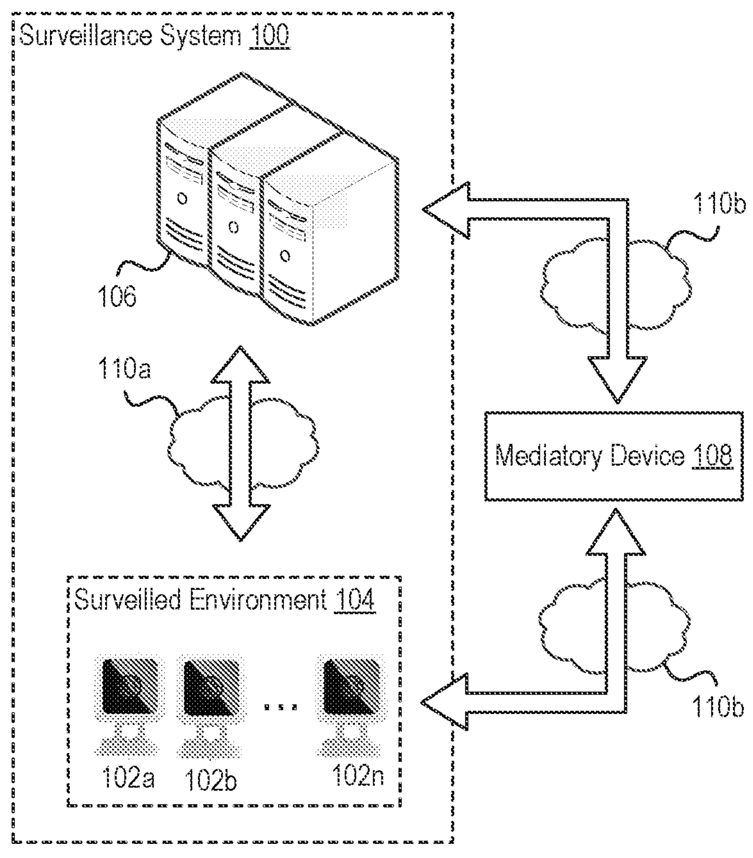
FIG. 1 includes a high-level illustration of a surveillance system that includes various edge devices that are deployed throughout an environment to be surveilled.

Various features of the technology described herein will become more apparent to those skilled in the art from a study of the Detailed Description in conjunction with the drawings. Embodiments are illustrated by way of example and not limitation in the drawings. Although the drawings depict various embodiments for the purpose of illustration, those skilled in the art will recognize that alternative embodiments may be employed without departing from the principles of the technology. Accordingly, while specific embodiments are shown in the drawings, the technology is amenable to various modifications.

DETAILED DESCRIPTION

As surveillance systems become more sophisticated, the importance of being able to detect different categories of objects—through analysis of audible content, visual content, or other data—has similarly increased. As an example, manufacturers of surveillance systems have begun adding more categories to their object detection services, including people, animals, vehicles, and packages. This not only permits the surveillance systems to detect a broader range of objects, but also allows for personalization, for example, to detect specific individuals, pets, and the like.

It is time consuming to add a new category of object to the data collection process in the conventional way, however. Initially, data associated with the new category must be sourced. Because this data is used to train a model to detect the new category, this data may be referred to as "training data." Then, the new category must be annotated in the training data along with all existing categories. The primary reason for annotating the training data is that the new model must perform well across a large sample of edge devices (and therefore, users of surveillance systems), which requires that sufficient training data be sourced to cover as many use cases as possible. This limits the development of a training system that can cater to the needs of an individual user who is looking for personalized intelligence services as current development pipelines are focused on building computer programs that suit a large population of users.

Introduced here is a training system (or simply "system") that allows users to define what they would like their surveillance systems to detect, recognize, or otherwise identify. Note that while embodiments may be described in the context of a system that is accessible to a surveillance system, the system need not necessarily be implemented in the surveillance system. Aspects of the system could be implemented in the surveillance system (and more specifically, its edge devices), a mediatory device to which the surveillance system is communicatively connected, or a server system to which the surveillance system is communicatively connected.

For simplicity, the use case provided by a given user for the purpose of teaching at least one edge device may be referred to as a "skill." A surveillance system can learn each of the skills provided by its respective user from a limited number of examples. For example, the given user may only provide several examples—or even a single example—in contrast to conventional learning approaches. Simply put, the system represents a solution to the aforementioned problem of recognizing unusual categories (also called "longtail categories") that can be encountered by a limited number of users as part of their daily routines.

Note that while the system may be described in the context of models that are employed by a given type of edge device, the system may be generally applicable across various edge devices, including cameras, lights, locks, sensors, and the like. For example, for the purpose of illustration, embodiments may be described in the context of a model that is designed and then trained to recognize objects in images that are generated by a camera. Such a model may be referred to as an "object recognition model." However, those skilled in the art will recognize that the technology may be similarly applicable to other types of models and other types of edge devices. For example, a similar approach may be taken in the event that the model is instead designed and then trained to recognize objects or events through analysis of audio generated by a sound sensor. Accordingly, the system could be extended to audible content, visual content, or other data.

As further discussed below, one advantage of the system is that it is designed for edge devices that are accessible to, and deployed by, users who may not understand how, exactly, edge intelligence frameworks are implemented by those edge devices. Accordingly, the system can serve as a platform for these users, in contrast to the more sophisticated training systems that have traditionally only been usable by developers responsible for developing the edge intelligence frameworks.

Embodiments may be described in the context of computer-executable instructions for the purpose of illustration. However, aspects of the technology could be implemented via hardware, firmware, or software. For example, an edge device may be configured to generate data that is representative of an ambient environment and then provide the data to a model as input. The model may reside on the edge device, or the model may reside on a server system to which the edge device is communicatively connected, either directly or indirectly. The model may produce, as output, an embedding for the data, and then the embedding can be compared against a set of embeddings that are created as part of a training operation in which a custom skill is defined by a user. A prediction can be made based on the degree to which the embedding corresponds with the embeddings included in the set.

Terminology

References in this description to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense. Thus, unless otherwise noted, the term "based on" is intended to mean "based at least in part on."

The terms "connected," "coupled," and any variants thereof are intended to include any connection or coupling between objects, either direct or indirect. The connection/coupling can be physical, logical, or a combination thereof. For example, objects may be electrically or communicatively coupled to one another despite not sharing a physical connection.

The term "module" may be used to refer broadly to software, firmware, or hardware. Modules are typically functional components that generate one or more outputs based on one or more inputs. A computer program may include one or more modules. Thus, a computer program may include multiple modules that are responsible for completing different tasks or a single module that is responsible for completing all tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open ended.

Overview of Surveillance System

FIG. 1 includes a high-level illustration of a surveillance system 100 that includes various edge devices 102*a-n* that are deployed throughout an environment 104 to be surveilled. While the edge devices 102*a-n* in FIG. 1 are cameras, other types of edge devices could be deployed throughout the environment 104 in addition to, or instead of, cameras. Other examples of edge devices include lights, locks, motion detectors, doorbells, thermostats, and the like. Meanwhile, the environment 104 may be, for example, a home or business.

In some embodiments, these edge devices 102*a-n* are able to communicate directly with a server system 106 that is comprised of one or more computer servers (or simply "servers") via a network 110*a*. In other embodiments, these edge devices 102*a-n* are able to communicate indirectly with the server system 106 via a mediatory device 108. The mediatory device 108 may be connected to the edge devices 102*a-n* and server system 106 via respective networks 110*b-c*. The networks a-c may be personal area networks (PANs), local area networks (LANs), wide area networks (WANs), metropolitan area networks (MANs), cellular networks, or the Internet. For example, the edge devices 102*a-n* may communicate with the mediatory device via Bluetooth®, Near Field Communication (NFC), or another short-range communication protocol, and the edge devices 102*a-n* may communicate with the server system 108 via the Internet.

Generally, a computer program executing on the mediatory device 108 is supported by the server system 106, and thus is able to facilitate communication with the server system 106. The mediatory device 108 could be, for example, a mobile phone, tablet computer, or base station. Thus, the mediatory device 108 may remain in the environment 104 at all times, or the mediatory device 108 may periodically enter the environment 104.

Historically, surveillance systems like the one shown in FIG. 1 operated in a "centralized" manner. That is, information generated by the edge devices 102*a-n* would be transmitted to the server system 106 for analysis, and the server system 106 would gain insights through analysis of the information. One benefit of this approach is that the server system 106 is generally well suited to employ computationally intensive models. However, significant communication resources are required to transmit the information to the server system 106, and the models applied by the server system—commonly called "global models"—may not be tailored for the edge devices 102*a-n*.

Edge intelligence has become increasingly common in an effort to address these issues. The term "edge intelligence" refers to the ability of the edge devices 102*a-n* to locally process the information, for example, prior to transmission of that information elsewhere. With edge intelligence, surveillance systems operate in a more "distributed" manner. In a distributed surveillance system, a global model may be created by the server system 106 and then deployed to the edge devices 102*a-n*. While each edge device may be permitted to tune its own version of the global model—commonly called the "local model"—based on its own data.

Figure 2:
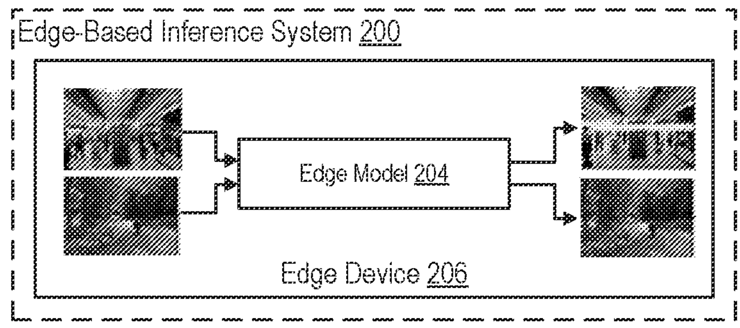
FIG. 2 includes a high-level illustration of an edge-based inference system and a cloud-based inference system.
Figure 2:
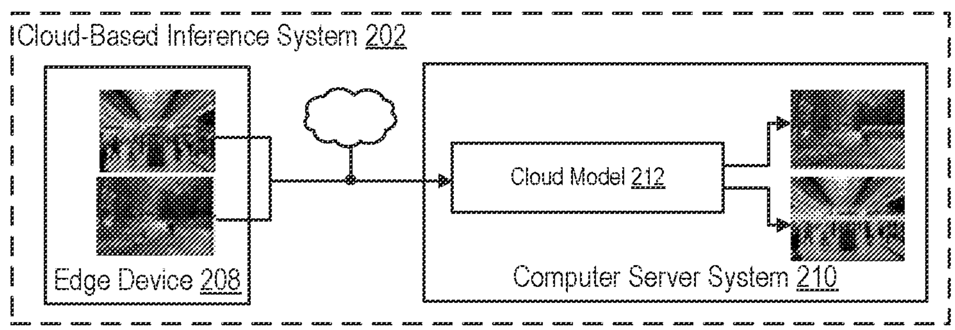

FIG. 2 includes a high-level illustration of an edge-based inference system 200 and a cloud-based inference system 202. Performing inference with the edge-based inference system 200 is less costly in terms of communication resources because the underlying data (e.g., the images) need not leave the edge device 206 and computation resources because the edge model 204 is relatively "lightweight," but will generally offer worse performance. Performing inference with the cloud-based inference system 202 is more costly in terms of communication resources because the underlying data (e.g., the images) need to be transmitted from the edge device 208 to the computer server system 210 (or simply "server system") and computation resources because the cloud model 212 is relatively "heavyweight," but will generally offer better performance. Unless noted otherwise, the approaches described herein are similarly applicable regardless of whether the system is implemented as part of an edge-based inference system 200 or a cloud-based inference system 202.

User Specification of Objects, Events, and Behaviors of Interest

As mentioned above, introduced here is a system that allows users to define what they would like their respective surveillance systems to recognize, detect, or otherwise identity. Examples include, but are not limited to (i) events such as whether the stovetop is on or whether the school bus has arrived; (ii) presence of objects such as whether a vehicle is located in a garage or whether a trash can is located near a street; and (iii) behaviors such as whether a person is delivering a packet near the front door or whether an infant is crying. Using the recognition capabilities offered by the system, users may be permitted to subsequently build customized notifications, alerts, reminders, automation schedules, and the like.

As further discussed below, the system may support a computer program that is executable by a mediatory device (e.g., mediatory device 108 of FIG. 1). The computer program may be in the form of a mobile application that is executable by a mobile phone, for example. Through the computer program, a user may be able to access interfaces through which to review audible content or visual content generated by the edge devices in her surveillance system. Some edge devices may only be able to generate audible content, while other edge devices may only be able to generate video content. Some edge devices may be able to generate audible and visual content. For example, cameras equipped with microphones may be able to generate audio files and corresponding images (e.g., in the form of a video clip). Further, some edge devices may not be able to generate audible content or visual content, but could instead generate some other form of data (e.g., indicating the time of events such as access events).

Through the interfaces, the user can label her inputs with custom categories. For example, the user may label a given input as representative of the detection of an event, or the user may label a given input as representative of the presence of an object. This "label data" can be used by the system to generate low-dimensional embeddings that represent the input data in a latent space that is unique for each category. These embeddings allow the system to categorize a new event, for example, in the form of audible content or visual content (e.g., a single image or video clip), into the category that was labeled by the user.

In some embodiments, the system is able to recommend skills to the user by searching for contrastive patterns in the scene under surveillance. For example, the system may surface patterns that may be of interest to users. Additionally or alternatively, the system may examine conduct of users to establish which patterns are of interest to users. Interest may be determined through analysis of the time spent reviewing samples generated by edge devices. Users may be able to use these recommendations to build their skills.

Embodiments of the system can have three major subcomponents that are built for event recognition, object detection, and sound detection on the input data provided by users. The process for learning new categories—which is set forth in greater detail below—can be activated via different types of requests, some of which may be automatically generated by the system and some of which may be manually submitted by users. Because performance of the system depends on the input data provided by each user, it is important to provide users with the ability to select appropriate models to cater to the needs of the problem that each user wants to solve. Simply put, users should have the flexibility to select an appropriate model, so as to ensure that each user can solve her problem. In some embodiments, the system offers iterative model selection to improve performance of the problem defined by a given user in several ways. These approaches range from recommendations to improve the quality of the input data to using deeper and more complex architectures (e.g., neural networks) to learn the problem in complex scenarios.

Overview of Challenges in Machine Learning

Over the last several years, the abilities of machine learning to accomplish tasks has increased exponentially. We have witnessed improvements ranging from cats being more readily detected in images to vehicles driving themselves. However, the traditional approaches to developing, training, and improving models suffer due to the biases of the datasets that those models are trained on. Advances in object recognition, object detection, instance segmentation, and the like have demonstrated mature performance on imbalanced datasets, but models still tend to suffer when generalizing to new categories. Simply put, adapting traditional approaches to new categories is a challenging task.

Manufacturers of surveillance systems have begun adding more categories to their object detection services, including people, animals, vehicles, and packages. As mentioned above, this not only permits the surveillance systems to detect a broader range of objects, but also allows for personalization, for example, to detect specific individuals, pets, and the like. It is time consuming to add a new category of object to the data collection process in the conventional way, however. Initially, training data associated with the new category must be sourced, and then the training data must be annotated with the new category and any existing categories. The primary reason for annotating the training data is that the new model must perform well across a large sample of edge devices (and therefore, users of surveillance systems), which requires that sufficient training data be sourced to cover as many use cases as possible. This limits the development of a training system that can cater to the needs of an individual user who is looking for personalized intelligence services as current development pipelines are focused on building computer programs that suit a large population of users.

Fortunately, it is possible to learn a high-performing customized model for each user and edge device with much less training data due to recent progress in few-shot learning, automated machine learning (also called "automated ML" or "AutoML"), and the like. In the present disclosure, a system is descried that can recognize "anything" that can be defined by a user. This system offers each user the ability to define a problem that she wishes her surveillance system will solve for her. To accomplish this, the user can provide examples that represent different instances of the problem, and these examples can be used by the system to learn how to solve the problem in future scenarios, which may be entirely different than those scenarios identified by the user. Additionally, this system may provide feedback, for example, to allow users to update the examples provided as input—or provide entirely new examples—to improve the solutions to their problems. The system can also offer a wide range of tools and guides to troubleshoot and improve performance to user expectations. In summary, the system aims to solve the longtail categories that are routinely encountered by users' surveillance systems, but are not common enough to warrant training on a broader (e.g., global) scale.

Overview of Personalized Model Generation

The system introduced here aims to provide a platform and an end-to-end solution where users can provide a small number of examples for each new category to be learned to predict future occurrences of similar events, objections, or behaviors. For example, a user may be able to define a new category with as few as three, four, or five examples in the form of images, video clips, or audio clips. In order to achieve this, the system leverages the progress that has been made in few-shot learning. Few-shot learning (also called "low-shot learning") is a type of machine learning method where the training data contains limited information. While the common practice for machine learning is to provide as much data as the model can take, few-shot learning allows insights to be gained through analysis of a limited number of examples. This is a key challenge in machine learning.

Despite recent developments in important domains such as computer vision and language, traditional machine learning methods (e.g., deep learning methods) do not provide a convincing solution for learning new concepts without requiring large amounts of labelled training data. On the other hand, many non-parametric methods—like family of nearest neighbors—do not require large amounts of training data but performance depends on the features that are used to represent the training data provided as input.

A. Few-Shot Learning

In few-shot learning, a deep neural network can be used to learn the best features (also called "embeddings") to represent the labelled training data provided as input. Then, parametric or non-parametric methods can be used to classify a new example into a category. Said another way, parametric or non-parametric methods can be used to classify a query against the support. One of the earliest approaches in few-shot learning is called "Matching Networks." With Matching Networks, the embedding and classification are combined to form an end-to-end differentiable nearest neighbors classifier.

Matching Networks initially embeds a high-dimensional example into a low-dimensional space and then performs a generalized form of nearest neighbors classification as described by the following equation:

$$\hat{y} = \sum_{i=1}^{k} a(\hat{x}, x_i) y_i. \quad \text{Eq. 1}$$

The meaning of this is that the prediction y of the model is the weighted sum of the labels $y_i$ of the support set, where the weights are a pairwise similarity function $a(\hat{x}, x_i)$ between the query example $\hat{x}$ and a support set example $x_i$. The labels $y_i$ in Eq. 1 are one-hot ended label vectors (e.g., [1,0,0] represents category 1, [0, 0, 1] represents category 3, etc.).

Another notable work in few-shot learning is prototypical networks. The key assumption is that there exists an embedding per each category to which samples from that category ($S_k$) cluster around it. This single prototypical representation ($c_k$) is simply the mean of the individual samples in category k, as shown below:

$$c_k = \frac{1}{|s_k|} \sum_{S_k} f_\phi(x_i). \quad \text{Eq. 2}$$

B. Operational Phases

The system has two primary phases of operation, namely, a training phase and an inferencing phase. In the training phase, a user can provide labelled examples as input through an interface (e.g., that is accessible via a computer program executing on a mediatory device) and then define a skill based on those labelled examples. A skill can be as simple as recognizing whether a vehicle is parked inside a garage. This is an example of a binary skill. Multiclass skills that have more than two categories could also be defined through the interface. For example, a user may input labelled examples to indicate that she would like her surveillance system to be able to recognize whether there are zero, one, or two vehicles in the garage.

After defining a skill, the user can then provide at least one example for each category in the skill. Generally, these examples are selected from among those labelled examples provided through the interface. However, there may be scenarios where the system prompts the user to input additional examples or different examples. For example, the system may determine, through analysis of the labelled examples, that quantity is insufficient for learning purposes. As a specific example, the system could discover that an image has been improperly labelled or that the label does not seem to be associated with a proper segment of the image. In such a scenario, the system may indicate (e.g., via a notification) that further information is necessary.

Thereafter, the system may receive input indicative of a request form the user to begin the training phase. In some embodiments, the system only initiates the training phase in response to a determination that a sufficient number (e.g., one, three, or five) of labelled examples have been provided for each category in the skill. As part of the training phase, the system can extract a low-dimensional embedding of each labelled example and represent the input data in the form of a support set. This support set can be used to compare a new sample to make categorical predictions during the inferencing phase.

Generally, the user is permitted to choose how or when to request the inferencing phase on a per-skill basis. Thus, the inferencing phase for each skill may be initiated based on a different triggering action. Examples of triggering actions include:

- Motion: Where movement indicative of a motion event is recognized through analysis of audible content or visual content;
- Request: Where input is received indicative of a manual request (e.g., input through the computer program executing on the mediatory device) to begin the inferencing phase or define a temporal criterion that is representative of a desired time of the day, week, month, or year to begin the inferencing phase;
- Object Detection: Where an object of interest is detected through analysis of visual content; and
- Sound Detection: Where sounds indicative of a sound event is recognized through analysis of audible content.

Figure 3:
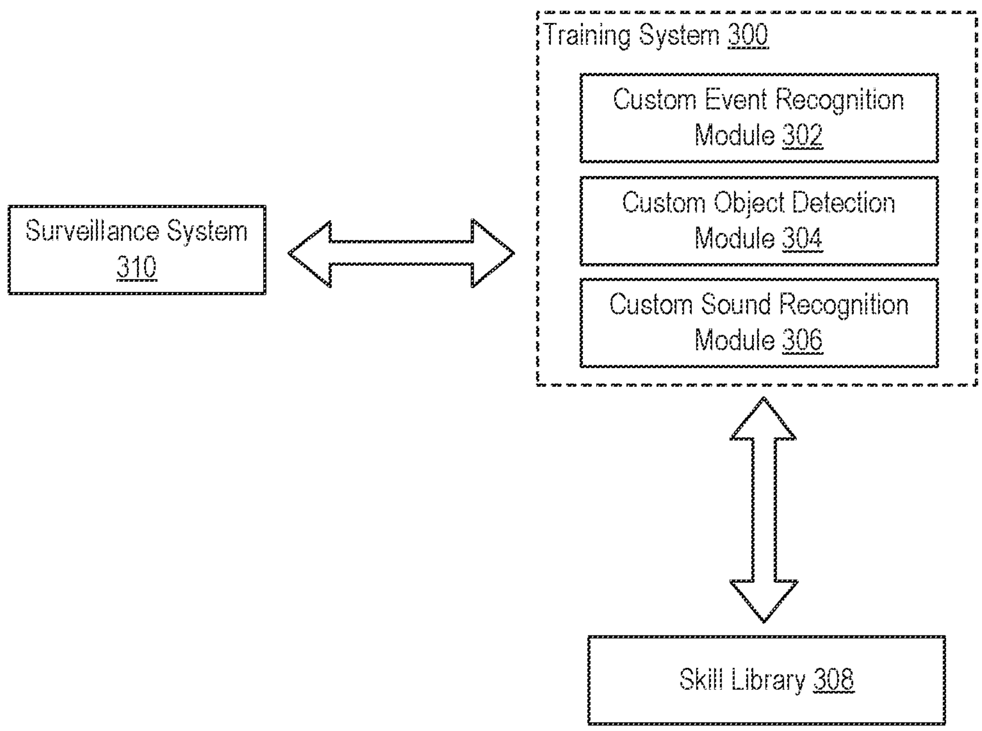
FIG. 3 includes a high-level illustration of a training system.

FIG. 3 includes a high-level illustration of the system 300. The system 300 is communicatively connected to a surveillance system 310 that a user is interested in customizing through the tailored creation of skills. Aspects of the system 300 could be implemented in the surveillance system 310 (e.g., in its edge devices), in a server system that is accessible to the surveillance system 308, or in a mediatory device that is accessible to the surveillance system 308. Thus, the system 300 could be implemented in any of the components shown in FIG. 1. However, the system 300 is generally accessible via a computer program that is executing on the mediatory device. The computer program could be, for example, a mobile application executing on a mobile phone or a web browser executing on a tablet computer or laptop computer.

As shown in FIG. 3, the system 300 includes four major components, namely, a custom event recognition module 302, a custom object detection module 304, a custom sound recognition module 306, and a skill library 308. These components are discussed in greater detail below, and while features may be discussed with reference to a specific component, those skilled in the art will recognize that these components may have similar capabilities unless noted otherwise. The custom event recognition module 302 may be responsible for enabling, supporting, or otherwise offering users the ability to recognize custom events, behaviors, and objects in the environment being surveilled by the surveillance system 310. The custom object detection module 304 may be responsible for detecting generic objects and then localizing those generic objects in the environment through the use of indicators (e.g., bounding boxes or coordinates). Moreover, the custom object detection module 304 may be responsible for classifying those generic objects with the custom categories defined by the user. Custom event recognition can be extended from visual content to audible content through the use of the custom sound recognition module 306. The custom sound recognition module 306 may be able to recognize events like dog barking, baby crying, police siren, and other categories defined by the user by processing audible content generated by one or more edge devices of the surveillance system 310.

Note that some edge devices may be able to generate audible content and visual content. As an example, a camera with a microphone may be able to generate a video clip with corresponding audio. In such a scenario, the system 300 could provide data generated by such an edge device to the custom event recognition module 302 and custom object detection module 304 for analysis of the visual content, as well as the custom sound recognition module 306 for analysis of the audible content.

Meanwhile, the skill library 308 may include the skills that have been defined by the user. The nature of the skill library 308 may depend on its location. In embodiments where the skill library 308 is maintained on the mediatory device, the skill library 308 may only include those skills defined by the user for the surveillance system 310. Similarly, in embodiments where the skill library 308 is maintained on the surveillance system 310 (e.g., on a base station or edge device), the skill library 308 may only include those skills defined by the user for the surveillance system 310. In embodiments where the skill library 308 is maintained on the server system, the skill library 308 could include skills defined by other users associated with other surveillance systems. Alternatively, the skill library 308 may be one of multiple skill libraries maintained in a data structure, and each skill library may be associated with a different user (and therefore, different surveillance system). Accordingly, the skill library 308 may be "siloed" even if stored in a data structure with other skill libraries.

C. Custom Event Recognition

Figure 4:
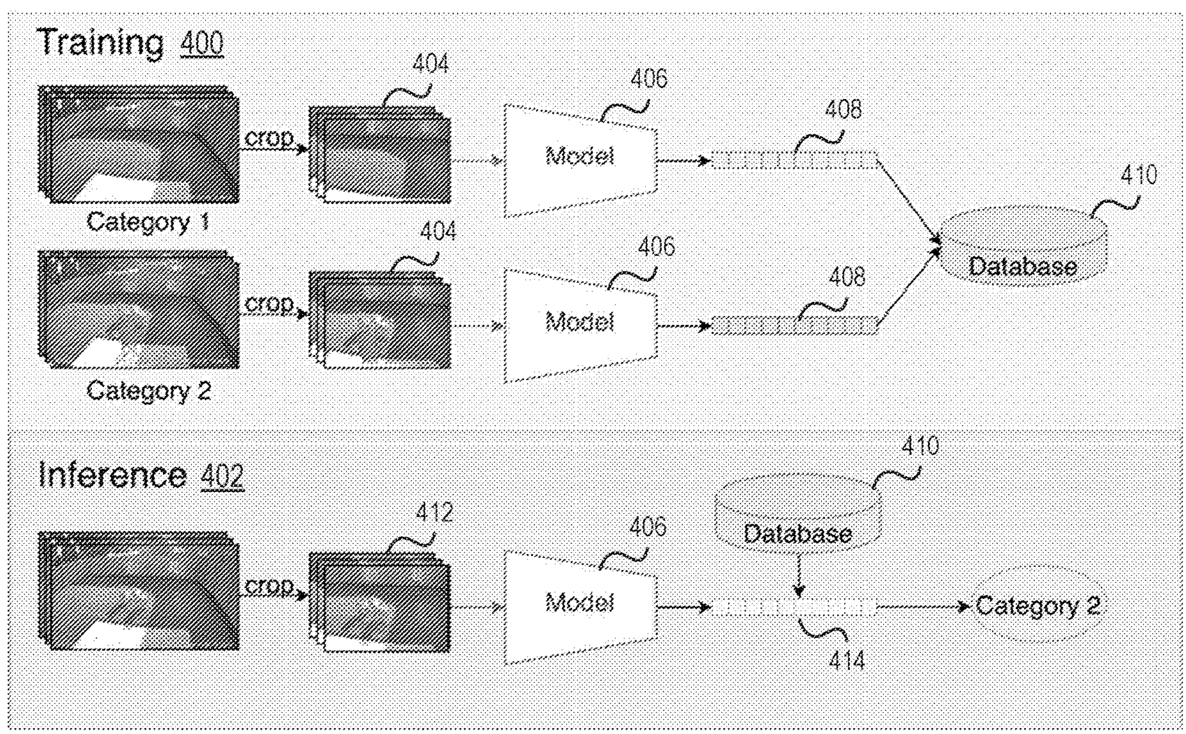
FIG. 4 includes a high-level illustration of the training phase and inferencing phase as performed by the custom event recognition module of FIG. 3.

FIG. 4 includes a high-level illustration of the training phase 400 and inferencing phase 402 as performed by the custom event recognition module 302 of FIG. 3. Initially, the system may receive input indicative of a user providing a region of interest per skill where key information is available. As an example, the user may identify a portion of an image that corresponds to an event of interest. The custom event recognition module 302 can crop the region of interest from the image as shown in FIG. 4, and then the custom event recognition module 302 can preprocess the cropped region 404 as necessary to match the requirements of the model 406 to be trained. Examples of preprocessing operations include (i) cropping regions of interest; (ii) converting the color scale; (iii) using select frames (also called "key-frames") or all frames to extract low-level embeddings that can help achieve temporal understanding; (iv) extracting semantic segmentation, skeleton, attention masks, or other forms of processed information; and (v) converting audio files to spectrograms, mu-law encodings, and the like.

The model 406 can then extract a low-dimensional embedding 408 for the cropped region 404. For example, the system may use a deep neural network to extract the low-dimensional embedding 408 for the cropped region 404 that serves as input. The architecture of the deep neural network can vary, and therefore may result in different performance. Meanwhile, the embedding representation can vary based on the features that are extracted from the deep neural network. The low-dimensional embedding 408 could be extracted from the final layer of the deep neural network or from multiple layers of the deep neural network in order to capture information from different scales and different hierarchical abstractions.

This process can be repeated for each sample in each category, and the resulting representations—namely, the embeddings 408—can be stored in a database 410. The database 410 may be referred to as the "support set" for the given skill. The support set 410 can include low-level representations of input data that are separated and labeled per each category. As an example, the support set 410 for the training phase 400 may include two labelled sets of low-level representations as there are two categories.

Thereafter, an inference request may be received by the system. For example, an image may be acquired from a camera that is part of the surveillance system for which the skill was defined in the training phase 400. In such a scenario, the custom event recognition module 302 can crop the image using the regions of interest provided by the user in the training phase 400 as a guide, so as to produce a cropped region 412. The custom event recognition module 302 can preprocess the cropped region 412, as necessary, and then pass the cropped region 412 through the model 406 to extract a low-dimensional embedding 414. Then, the custom event recognition module 302 can compare the low-dimensional embedding 414 against the support set 410, for example, using cosine or Euclidean distance, to make a prediction. At a high level, the prediction may be representative of a decision as to whether the cropped region 412 satisfies or matches the skill defined as part of the training phase 400. Further, the custom event recognition module 302 may estimate a confidence score for the prediction. The confidence score may be used to understand the uncertainty of the prediction.

Note that, in some embodiments, predictions made by the custom event recognition module 302 can be averaged over a temporal window to aggregate confidence before making a final prediction. Thus, the custom event recognition module 302 may monitor its outputs over an interval of time, such that the final prediction can be made more confidently. The threshold for confidence, as well as the durations of the temporal window over which the predictions are monitored, can be altered.

As part of the training phase 400, the user may define which samples are to be examined as part of the inferencing phase 402. For example, the user may specify—or the system may determine—that the labelled examples were generated by a given edge device (e.g., the camera located in the backyard). Information that is indicative of the given edge device, such as an identifier, may be appended to the support set 410, such that the support set 410 is only applied to samples generated by the given edge device during the inferencing stage 402. Thus, the user may not only customize the skills of the surveillance system, but the user may also indicate how those skills should be utilized in an intelligent manner. Additionally or alternatively, the system may learn to apply each support set only to those samples generated by the same edge device(s) as the corresponding labelled examples. Applying support sets in a more thoughtful and strategic manner can result in significant savings in terms of computational resources, as well as quicker predictions.

D. Custom Object Detection

Figure 5:
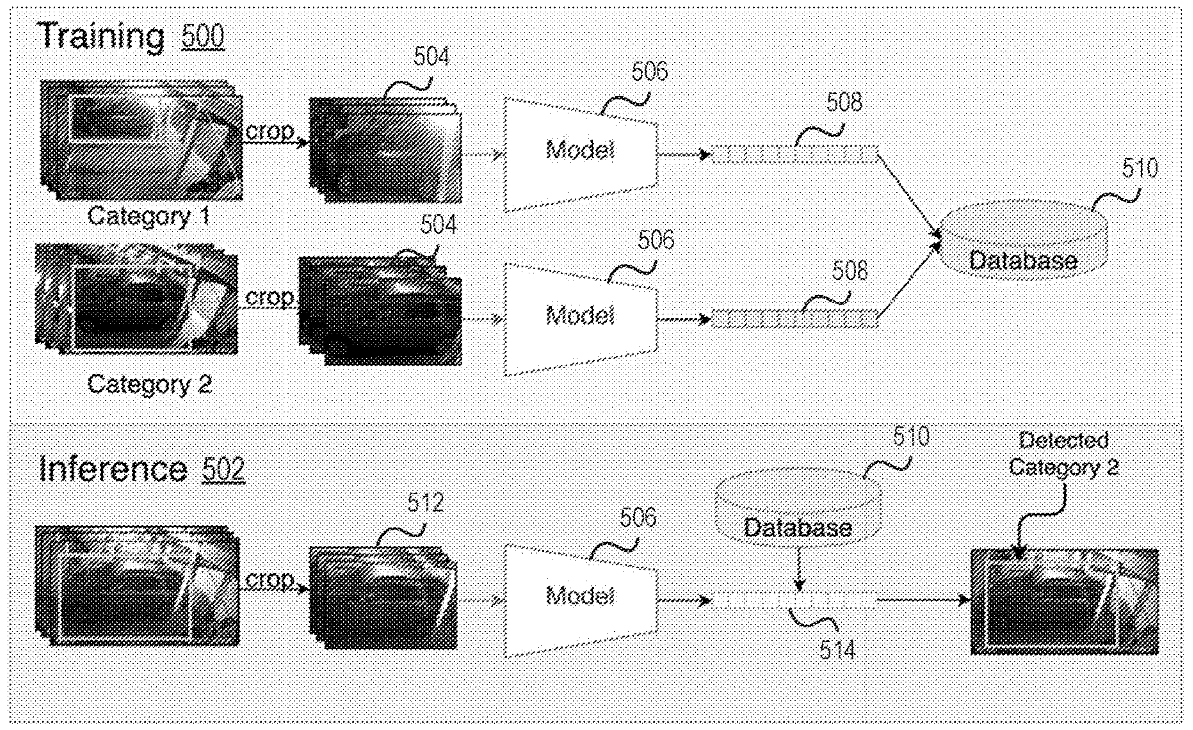
FIG. 5 includes a high-level illustration of the training phase and inferencing phase as performed by the custom object detection module of FIG. 3.

In contrast to custom event recognition, custom object detection may use outputs produced by object detectors to extract regions of interest. The term "object detector" is generally used to refer to a specialized model that is designed and then trained to detect instances of objects in a certain class through analysis of pixel data. FIG. 5 includes a high-level illustration of the training phase 500 and inferencing phase 502 as performed by the custom object detection module 304 of FIG. 3. The custom object detection module 304 may permit a user to create a skill by defining relatively few (e.g., 3, 5, or 10) objects of interest. As a specific example, the user may be able to define a skill for recognizing different types of vehicles—such as a BMW X5 and Tesla Model X as shown in FIG. 5—in her garage. While the objects of interest in this example are vehicles, those skilled in the art will recognize that the approach may be similarly applicable to other types of objects.

In the training phase 500, the user can identify the objects of interest—thereby defining the categories—and then provide examples for each object of interest. Here, for example, the user identifies several images that include the BMW X5 and several images that include the Tesla Model X. The custom object detection module 304 can then crop the regions of the images that correspond to these vehicles, so as to produce cropped regions 504. The custom object detection module 304 can preprocess the cropped regions 504, as necessary, and then provide the cropped regions 504 to the model 506 for extraction of low-level embeddings 508 that can be saved to a database 510 (also called the "support set" for the skill).

Thereafter, an inference request may be received by the system. For example, an image may be acquired from a camera that is part of the surveillance system for which the skill was defined in the training phase 500. In the inferencing phase 502, the custom object detection module 304 may initially provide the image to the object detector in response to a determination that the inference request is triggered by the user. The object detector may initially check for the presence of objects of interest. In the absence of any objects of interest, the custom object detection module 304 can output a status that the objects of interest were not found. Alternatively, if at least one object of interest was found, then the region 512 corresponding to each object of interest can be cropped, the cropped region 512 can be pre-processed if necessary, and then a low-level embedding 514 can be extracted for the cropped region 512. In some scenarios, multiple objects of interest may be found in a single image. In such a scenario, multiple embeddings are extracted by the custom object detection module 304. Regardless of the number of embeddings, the custom object detection module 304 can compare each embedding to the support set 510 to make predictions on a per-embedding basis. Each prediction can then be assigned to the initial region where the corresponding object was detected by the object detector.

E. Custom Sound Recognition

Figure 6:
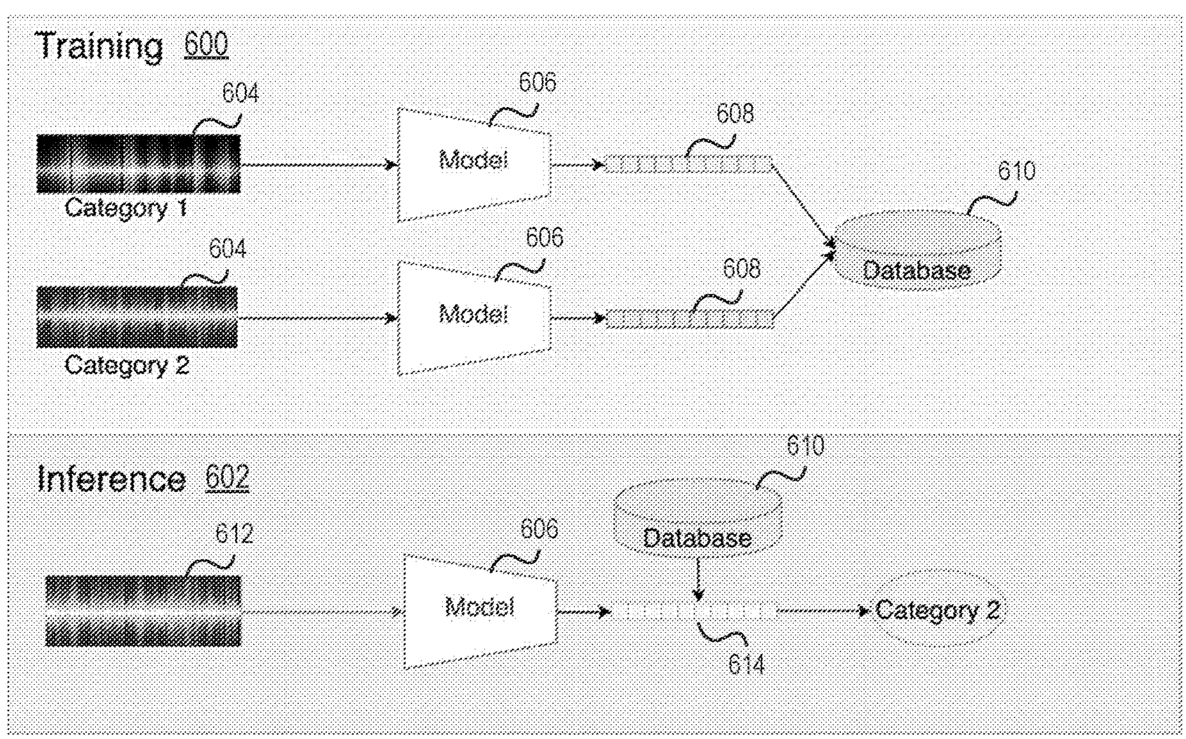
FIG. 6 includes a high-level illustration of the training phase and inferencing phase as performed by the custom sound recognition module of FIG. 3.

Much like custom event recognition, custom sound recognition provides users a platform to recognize custom sounds. FIG. 6 includes a high-level illustration of the training phase 600 and inferencing phase 602 as performed by the custom sound recognition module 306 of FIG. 3. In the training phase 600, the system can receive input indicative of a request from a user to define a skill. Generally, the request is accompanied by at least one example 604 for each category as shown in FIG. 6. The custom sound recognition module 306 can then preprocess the example 604, as necessary, and then provide the examples 604 to a model 606 so as to extract low-level embeddings 608. The custom sound recognition module 306 can store the low-level embeddings 608 in a database 610 (also called the "support set" for the skill).

When an inference is requested, the custom sound recognition module 306 can acquire a new sample 612 that is generated by an edge device included in the surveillance system for which the skill is defined. The custom sound recognition module 306 can preprocess the new sample 612, as necessary, and then provide the new sample 612 to the model 606 so as to extract a low-level embedding 614. The low-level embedding 614 can then be compared against the support set 610 to determine a prediction along with a confidence score.

F. Iterative Model Selection for Improved Performance

Performance of the system depends on various factors, including the complexity of the skill, diversity of the examples provided by the user, changes in the scene (e.g., due to ambient illumination, ambient noise, weather, appearance, etc.), and the like. In order to account for these variations and ensure satisfactory performance, the system may support iterative model selection. Iterative model selection may be offered for operations including:

- Data-based improvements such as:
  - Adding misclassified inputs to the support set;
  - Adding adverse examples or new examples to the support set; and
  - Adding physical markers or digital indicators to make examples from different categories more distinguishable from one another; and
- Model-based improvements such as:
  - Switching to a more complex model (e.g., a deeper neural network) to extract better embeddings;
  - Switching to a higher dimensional embedding; and
  - Replacing the distance-based comparison with a parametric classifier.

Figure 7:
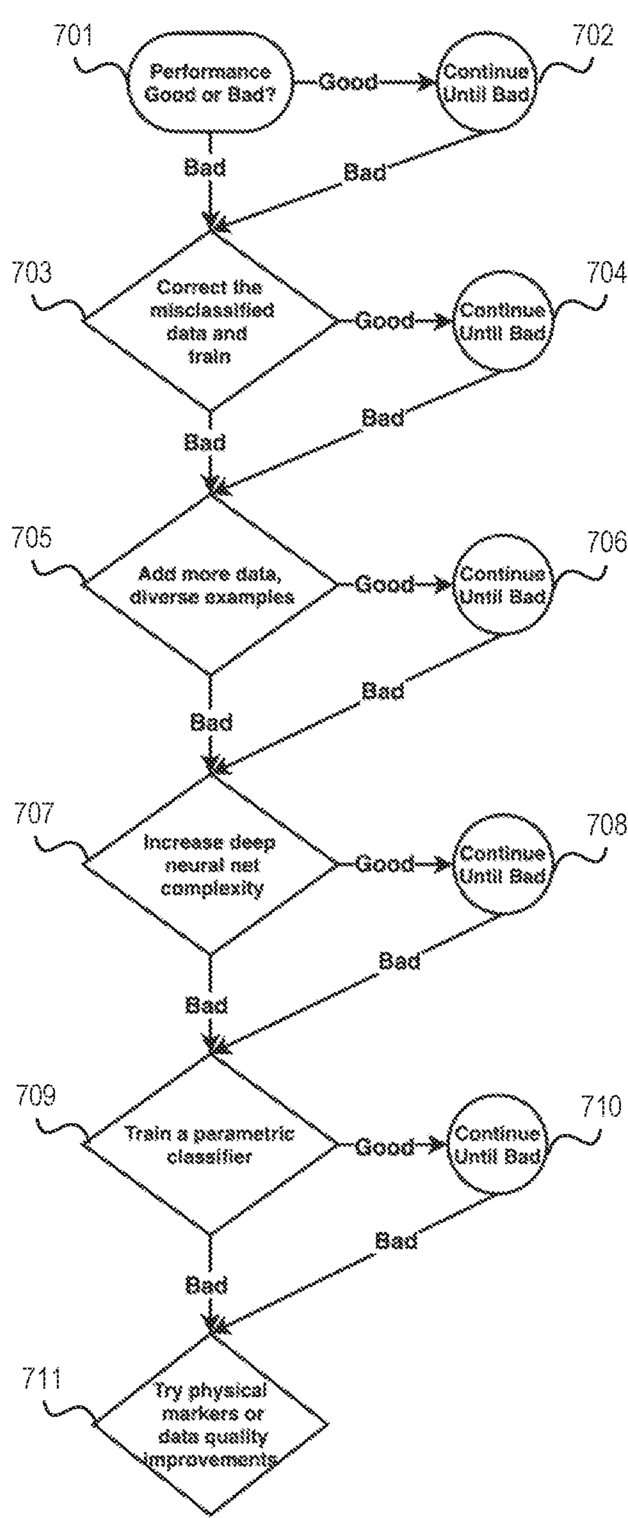
FIG. 7 includes a flow diagram of a process for iteratively selecting a model to improve performance of the system.

FIG. 7 includes a flow diagram of a process for iteratively selecting a model to improve performance of the system. Initially, the system can establish how performance of the model compares against a predetermined quality threshold. Said another way, the system can determine whether performance of the model is sufficiently good (step 701). In the event that performance is sufficiently good, the system can continue implementing the model until performance falls below the quality threshold (step 702).

When performance falls below the quality threshold—or if performance is initially below the quality threshold—the system can correct the misclassified data and then retrain the model (step 703). Again, the system can continue implementing the model until performance falls below the quality threshold (step 704).

When performance falls below the quality threshold, the system can add more training data (step 705), for example, to provide more diverse examples from which to learn. The system can then retrain the model using the expanded training data. Again, the system can continue implementing the model until performance falls below the quality threshold (step 706).

When performance falls below the quality threshold, the system can increase the complexity of the model (step 707). For example, if the model is a neural network, then the system may increase the number of layers, thereby "deepening" the neural network. Again, the system can continue implementing the model until performance falls below the quality threshold (step 708).

When performance falls below the quality threshold, the system can train a parametric machine learning algorithm (step 709). Parametric machine learning algorithms (also called "parametric classifiers") are algorithms that simply the functions to which they are applied to a known form. At a high level, a parametric classifier selects a form for the corresponding function and then learns the coefficients for the function from training data. Again, the system can continue implementing the model until performance falls below the quality threshold (step 710). If performance again falls below the quality threshold, then the system may try physical markers or other data quality improvements (step 711) in an effort to improve performance.

Methodologies for Creating and Implementing Skills

Figure 8A:
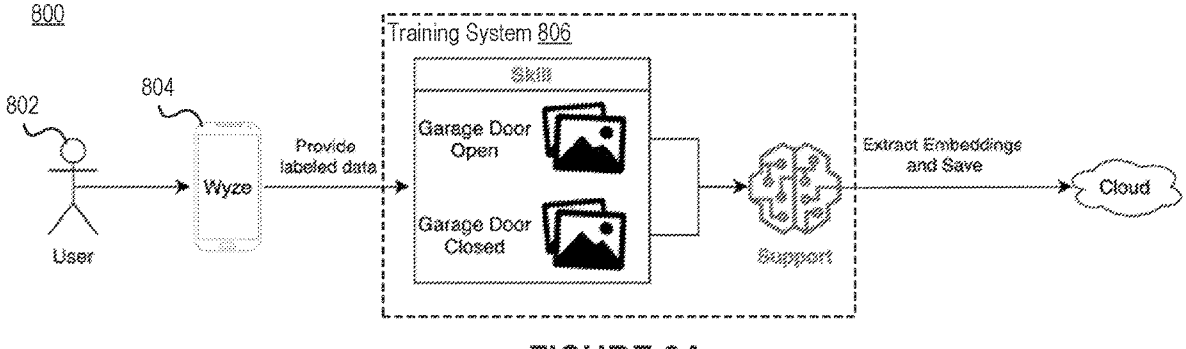
FIG. 8A includes a high-level illustration of a process for creating a new skill.

FIG. 8A includes a high-level illustration of a process 800 for creating a new skill. As shown in FIG. 8A, a user 802 may initially access an interface through a computer program executing on a computing device 804. The computing device 804 may be the mediatory device 108 of FIG. 1. Through the interface, the user 802 can provide labeled examples that correspond to different categories of a classification scheme. Assume, for example, that the user 802 is interested in defining a skill that, when implemented by her surveillance system, indicates whether the garage door is open or closed. To accomplish this, the user 802 may upload at least one image of the garage door in the open position and at least one image of the garage door in the closed position. These images may be generated by an edge device that is part of the surveillance system. For example, these images may be generated by a camera located inside the garage that is oriented toward the garage door, or these images may be generated by a camera located outside the garage that is oriented toward the garage door. Depending on the nature of the skill, the system 806 can programmatically define the skill by extracting embeddings for the images and then saving those embeddings as a support set as discussed above. The support set could be saved to a server system as shown in FIG. 8A, or the support set could be saved elsewhere (e.g., to the computing device 804 or a base station of the surveillance system).

Note that the underlying data of the labelled examples can be acquired in various ways. Users can provide examples for each category of each skill by initiating recording of events, choosing events detected by the surveillance system, or selecting events recommended by the system, for example, using an active learning-based method that can help improve the performance of the system for a specific skill.

Further, the system may support audible content (e.g., in the form of audio clips) and visual content (e.g., in the form of still images and video slips). These input modalities can be accessed in different formats. For example, images could be acquired for which the pixel data is in RGB or YUV format, or images could be acquired for which the pixel data is representative of infrared values.

Figure 8B:
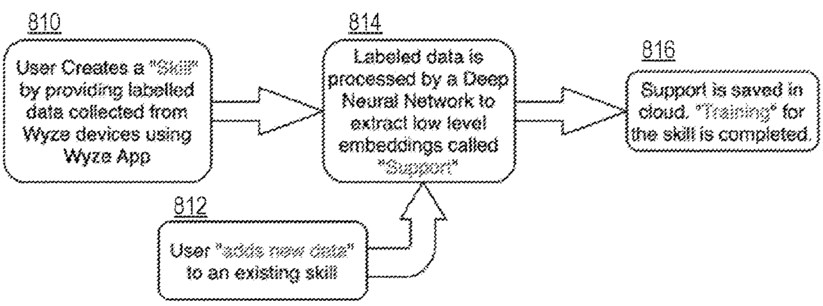
FIG. 8B includes a flowchart that illustrates how a new skill can be created by the user via interfaces generated by the training system.

Meanwhile, FIG. 8B includes a flowchart that illustrates how a new skill can be created by the user 802 via interfaces generated by the system 806. Initially, the user 802 can define a skill by providing labelled examples to the system 806 as input (step 810). As mentioned above, these labelled examples may be representative of samples collected from one or more edge devices included in the surveillance system for which the skill is being created. In some embodiments, the computer program through which the user 802 is able to define the skill permits review of samples generated by the edge devices of the surveillance system. Accordingly, the user 802 may be able to readily review samples that have been generated by the edge devices and then select a subset of those samples to be used as the labelled examples.

Alternatively, the user 802 may opt to add new training data for an existing skill (step 812). Assume, for example, that the surveillance system is already able to determine whether a vehicle is presently parked inside a garage, but the user 802 wishes to teach the surveillance system to specify which of multiple vehicles are presently parked inside the garage. In such a scenario, the user 802 can select images of each of the multiple vehicles, and these images can serve as the labelled examples.

Whether the user 802 is interested in creating a new skill or altering an existing skill, the labelled examples can be processed by a model to extract low-level embeddings (step 814). These low-level embeddings may be called the "support set" for the skill. The model may be a deep neural network, for example. The system can then cause the support set to be saved in a server system (step 816). In embodiments where the system is executing on the server system, the support set may simply be committed to memory. However, in embodiments where the system is located elsewhere (e.g., on the computing device 804), the system may transmit the support set to the server system.

Figure 9A:
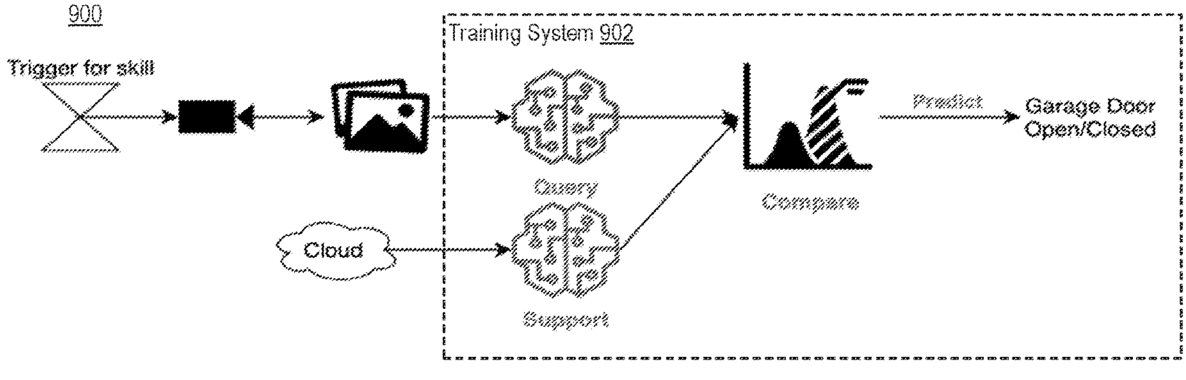
FIG. 9A includes a high-level illustration of a process for operationalizing a model with a skill.

FIG. 9A includes a high-level illustration of a process 900 for operationalizing a model with a skill. Initially, the system 902 may receive input indicative of a triggering action for instituting a skill. For example, the system 902 may discover one or more values included in data generated by an edge device that match a pattern-defining parameter. The pattern-defining parameter may depend on the nature of the data. For example, if the data is representative of images generated by a camera, then the triggering action may be the discovery of an object exceeding a predetermined size in at least one of the images. As another example, if the data is representative of audio generated by a microphone, then the triggering action may be the presence of sound—indicating a person is nearby—or the discovery of a particular sound (e.g., crying of a baby, beeping of a vehicle, etc.) that is indicative of an event or object.

As discussed above with reference to FIGS. 4-6, at least a portion of the data can be provided to a model by the system 902, so as to produce an embedding. The system 902 can then compare the embedding against a support set established for the skill as part of the training phase. Based on the degree of similarity between the embedding and embeddings in the support set, the system can output a prediction. Referring again to the example of FIG. 8A, if the user defines the skill to determine whether the garage door is presently open or closed, then the prediction can indicate whether the garage door is presently open or closed.

Note that skills could be defined as open- or closed-ended conditions. Here, for example, there are exactly two possibilities—namely, garage door open and garage door closed—and the user provided labelled evidence of each possibility during the training phase. As such, the system 902 can determine an appropriate prediction based on whether the embedding of the new sample is more similar to the embeddings for garage door open in the support set or the embeddings for garage door closed in the support set. However, some embodiments of the system 902 may permit skills to be more open ended. Assume, for example, that the user wishes to teach the surveillance system to determine whether the garage door is presently open or closed. However, the user only has access to labelled examples for one of the conditions (e.g., garage door closed). In such a scenario, the system 902 may programmatically define the skill so that during the inferencing phase, the prediction is (i) garage door close in response to a determination that the embedding sufficiently matches the support set and (ii) garage door open in response to a determination that the embedding does not sufficiently match the support set. Thus, the system 902 may be able to infer certain conditions even if labelled examples are not provided for training purposes.

Figure 9B:
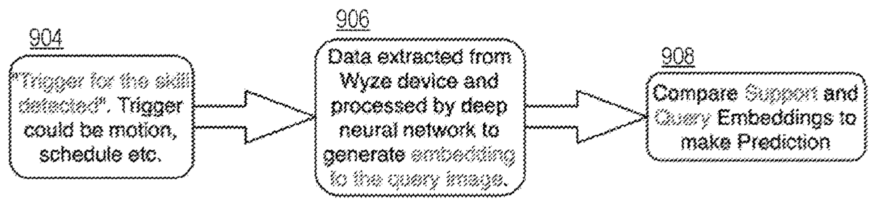
FIG. 9B includes a flowchart that illustrates how an existing skill can be implemented by the training system.

Meanwhile, FIG. 9B includes a flowchart that illustrates how an existing skill can be implemented by the system 902. Initially, the system 902 can receive input indicative of a discovery of a triggering action (step 904). As discussed above, the triggering action may be discovered through analysis of data generated by the edge devices of the surveillance system. Alternatively, the triggering action may be representative of a request from a user to implement the existing skill. For example, the user may specify, through an interface, that she would like the existing skill to be implemented on data generated by a given edge device.

The system 902 can then acquire a sample, for example, through acquisition from the edge device responsible for generating the sample and then provide the sample to the model to generate an embedding (step 906). Thereafter, the system can compare the embedding against a support set in order to make a prediction (step 908). The support set may be representative of a collection of embeddings computed for labelled examples provided as training data during the training phase. The prediction may be stored in a data structure by the system 902. The data structure may be associated with the surveillance system, though the data structure may be maintained on a server system that is accessible to the surveillance system (e.g., via the Internet). Additionally or alternatively, the system 902 may cause display of the prediction on an interface that is accessible to the user associated with the surveillance system for which the prediction is produced.

Processing System

Figure 10:
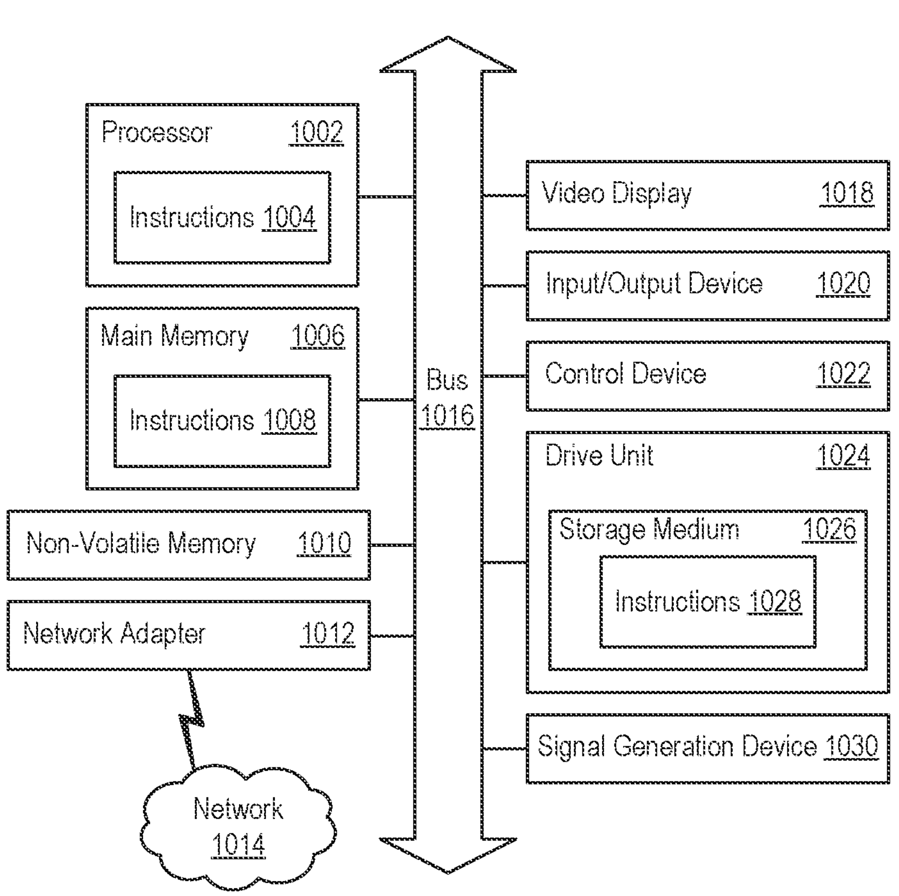
FIG. 10 is a block diagram illustrating an example of a processing system in which at least some processes described herein can be implemented.

FIG. 10 is a block diagram illustrating an example of a processing system 1000 in which at least some processes described herein can be implemented. For example, components of the processing system 1000 may be hosted on an edge device, mediatory device, or server system.

The processing system 1000 may include a processor 1002, main memory 1006, non-volatile memory 1010, network adapter 1012, video display 1018, input/output devices 1020, control device 1022 (e.g., a keyboard or pointing device), drive unit 1024 including a storage medium 1026, and signal generation device 1030 that are communicatively connected to a bus 1016. The bus 1016 is illustrated as an abstraction that represents one or more physical buses or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), Inter-Integrated Circuit ($I^2C$) bus, or an Institute of Electrical and Electronics Engineers (IEEE) standard 1394 bus (also referred to as "Firewire").

The processing system 1000 may share a similar processor architecture as that of a desktop computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1000.

While the main memory 1006, non-volatile memory 1010, and storage medium 1026 are shown to be a single medium, the terms "machine-readable medium" and "storage medium" should be taken to include a single medium or multiple media (e.g., a centralized/distributed database and/or associated caches and servers) that store one or more sets of instructions 1028. The terms "machine-readable medium" and "storage medium" shall also be taken to include any medium that is capable of storing, encoding, or carrying a set of instructions for execution by the processing system 1000.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in an electronic device. When read and executed by the processors 1002, the instruction(s) cause the processing system 1000 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 1010, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

The network adapter 1012 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications (e.g., to regulate the flow of traffic and resource sharing between these entities). The firewall may additionally manage and/or have access to an access control list that details permissions including the access and operation rights of an object by an individual, a machine, or an application, and the circumstances under which the permission rights stand.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:

storing a set of embeddings in a database, wherein each embedding in the set of embeddings is generated as part of a training operation in which a user defines multiple categories, each of which is associated with at least one embedding included in the set of embeddings;

appending, to the set of embeddings, an identifier associated with an edge device of a surveillance system, wherein each embedding in the set of embeddings is generated based on a particular sample captured by the edge device;

acquiring a new sample generated by the edge device, wherein the new sample is associated with the identifier;

providing the new sample to a model as input, so as to produce an embedding;

in response to determining, using the identifier, that the new sample and the set of embeddings are associated with the edge device, comparing the embedding against the set of embeddings; and outputting a prediction based on an outcome of said comparing.

2. The method of claim 1, wherein the prediction is representative of an assignment of the new sample to a category of the multiple categories, and wherein the category corresponds to whichever embedding in the set of embeddings is determined to most closely correspond to the embedding.

3. The method of claim 1, further comprising:

receiving input indicative of an acquisition of data generated by the surveillance system; and determining that one or more values included in the data match a pattern-defining parameter;

wherein said acquiring the new sample is performed in response to said determining that one or more values included in the data match the pattern-defining parameter.

4. The method of claim 3, wherein the data is generated by another edge device of the surveillance system.

5. The method of claim 1, further comprising:

receiving input indicative of a request from a user to initiate an inferencing phase;

wherein said acquiring the new sample is performed in response to said receiving the input.

6. The method of claim 1, wherein said acquiring the new sample is performed in response to a determination that a time matches a temporal criterion specified by a user.

7. The method of claim 1, wherein said outputting the prediction comprises:

causing display of the prediction on an interface that is accessible via a computer program through which the surveillance system is manageable.

8. The method of claim 1, wherein the edge device includes a camera, and wherein the new sample is representative of a digital image.

9. The method of claim 1, wherein the edge device includes a microphone, and wherein the new sample is representative of an audio file.

10. The method of claim 1, wherein said acquiring the new sample, said providing the new sample, said comparing the embedding, and said outputting the prediction are performed by a system implemented in the edge device.

11. One or more non-transitory, computer-readable storage media comprising instructions recorded thereon, wherein the instructions, when executed by at least one data processor of a system, cause the system to:

store a set of embeddings in a database, wherein each embedding in the set of embeddings is generated as part of a training operation in which a user defines multiple categories, each of which is associated with at least one embedding included in the set of embeddings;

append, to the set of embeddings, an identifier associated with an edge device of a surveillance system, wherein each embedding in the set of embeddings is generated based on a particular sample captured by the edge device;

acquire a new sample generated by the edge device, wherein the new sample is associated with the identifier;

provide the new sample to a model as input, so as to produce an embedding;

in response to determining, using the identifier, that the new sample and the set of embeddings are associated with the edge device, compare the embedding against the set of embeddings; and output a prediction based on an outcome of said comparing.

12. The one or more non-transitory, computer-readable storage media of claim 11, wherein the prediction is representative of an assignment of the new sample to a category of the multiple categories, and wherein the category corresponds to whichever embedding in the set of embeddings is determined to most closely correspond to the embedding.

13. The one or more non-transitory, computer-readable storage media of claim 11, further comprising instructions causing the system to:

receive input indicative of an acquisition of data generated by the surveillance system; and determine that one or more values included in the data match a pattern-defining parameter;

wherein said acquiring the new sample is performed in response to said determining that one or more values included in the data match the pattern-defining parameter.

14. The one or more non-transitory, computer-readable storage media of claim 13, wherein the data is generated by another edge device of the surveillance system.

15. The one or more non-transitory, computer-readable storage media of claim 11, further comprising instructions causing the system to:

receive input indicative of a request from a user to initiate an inferencing phase;

wherein said acquiring the new sample is performed in response to said receiving the input.

16. The one or more non-transitory, computer-readable storage media of claim 11, wherein said acquiring the new sample is performed in response to a determination that a time matches a temporal criterion specified by a user.

17. The one or more non-transitory, computer-readable storage media of claim 11, wherein said outputting the prediction comprises:

causing display of the prediction on an interface that is accessible via a computer program through which the surveillance system is manageable.

18. The one or more non-transitory, computer-readable storage media of claim 11, wherein the edge device includes a camera, and wherein the new sample is representative of a digital image.

19. The one or more non-transitory, computer-readable storage media of claim 11, wherein the edge device includes a microphone, and wherein the new sample is representative of an audio file.

20. The one or more non-transitory, computer-readable storage media of claim 11, wherein said acquiring the new sample, said providing the new sample, said comparing the embedding, and said outputting the prediction are performed by a system implemented in the edge device.

* * * * *